United States Patent
Blomgren (10) Patent No.: US 9,292,285 B2
(45) Date of Patent: Mar. 22, 2016

(54) INTERPOLATION IMPLEMENTATION

(71) Applicant: Apple Inc., Cupertino, CA (US)

(72) Inventor: James S. Blomgren, Austin, TX (US)

(73) Assignee: Apple Inc., Cupertino, CA (US)

( * ) Notice: Subject to any disclaimer, the term of this patent is extended or adjusted under 35 U.S.C. 154(b) by 299 days.

(21) Appl. No.: 13/970,563

(22) Filed: Aug. 19, 2013

(65) Prior Publication Data

US 2015/0052335 A1    Feb. 19, 2015

(51) Int. Cl.
*G06F 7/483* (2006.01)
*G06F 9/30* (2006.01)

(52) U.S. Cl.
CPC .......... *G06F 9/3001* (2013.01); *G06F 9/30014* (2013.01)

(58) Field of Classification Search
None
See application file for complete search history.

(56) References Cited

U.S. PATENT DOCUMENTS

| | | | |
|---|---|---|---|
| 5,157,388 A * | 10/1992 | Kohn | 345/673 |
| 5,740,344 A * | 4/1998 | Lin et al. | 345/587 |
| 6,822,654 B1 | 11/2004 | Trivedi et al. | |
| 7,002,602 B2 | 2/2006 | MacInnis et al. | |
| 7,015,921 B1 | 3/2006 | Trivedi et al. | |
| 7,548,248 B2 | 6/2009 | Weybrew et al. | |
| 7,876,330 B2 * | 1/2011 | Hagiwara | 345/589 |
| 8,111,430 B2 * | 2/2012 | Kodama | 358/3.24 |
| 8,139,061 B2 | 3/2012 | Muff et al. | |
| 8,407,271 B2 | 3/2013 | Hurd et al. | |
| 2015/0052335 A1 * | 2/2015 | Blomgren | 712/222 |

OTHER PUBLICATIONS

Kari Pulli, et al., "Mobile 3D Graphics with OpenGL ES and M3G," Elsevier Inc, 2008, 446 pages.

* cited by examiner

*Primary Examiner* — David H Malzahn
(74) *Attorney, Agent, or Firm* — Meyertons, Hood, Kivlin, Kowert & Goetzel, P.C.

(57) ABSTRACT

Techniques are disclosed relating to floating-point operations in computer processors. In one embodiment, an apparatus includes a floating-point unit and circuitry configured to receive an initial value X for a floating-point operation. In this embodiment, X is between 0 and 1.0 inclusive. In this embodiment, the circuitry is configured to generate first and second floating-point values based on an exponent of X that sum to 1. In this embodiment, the floating-point unit is configured to perform an operation using the first and second floating-point values. The apparatus may reduce drift, in this embodiment, when a floating-point representation of X does not guarantee that the sum of X and (1−X) is 1. The apparatus may be configured to perform blending and/or interpolation operations using the first and second floating-point values.

20 Claims, 6 Drawing Sheets

Exponent = 8    f9 through f0 = 1's

410  X (16-bit floating-point): 0 | 01000 | 1111111111

415  X =    (binary) 0.00000011111111111                          = (decimal) 0.015617370605468075

420  1-X = (binary) 0.11111100000000001111111111111111            = (decimal) 0.984382629394531025

425  1-X (16-bit floating-point): 0 | 01111 | 1111111000000      = (decimal) 0.984375

430  X+(1-X) = (decimal) 0.9999923706 < 1

→ A and B generated according to the table of Fig. 3

435  A (16-bit floating-point): 0 | 01000 | 1111000000

440  A =    (binary) 0.000000011111                               = (decimal) 0.01513671875

445  B (16-bit floating-point): 0 | 01110 | 1111100001
                                                                  ────────→ +1 to LSB of B significand
450  B =    (binary) 0.11111100001                                = (decimal) 0.98486328125

INTERPOLATION IMPLEMENTATION

BACKGROUND

1. Technical Field

This disclosure relates generally to floating-point operations in computer processors.

2. Description of the Related Art

Blending operations in a graphics unit may involve determining a resulting color component for a particular pixel based two input color components. For example, linear interpolation is one form of blending and involves the operation C*X+D*(1−X) where C and D may be any value (e.g., input pixel color component values) and X is between 0 and 1.0 inclusive. For example, if X is large, C is given larger weight, while if X is small, D is given larger weight in the blending.

When X is represented in some floating-point formats, X+(1−X) may not be guaranteed to be equal to 1. For example, when X is smaller than 0.5, a floating-point representation of X may have more precision than a floating-point representation of 1-X and X+(1−X) may be less than 1 when rounding to zero. Thus, if multiple blending operations are performed, the components of a pixel may gradually shift toward zero, eventually causing the pixel to appear black. Shifts in the other direction may similarly occur for other rounding modes.

SUMMARY

Techniques are disclosed relating to floating-point operations in computer processors. The techniques disclosed herein may reduce or prevent drift when performing interpolation operations, for example, in a performance-efficient and/or power-efficient manner.

In one embodiment, an apparatus includes a floating-point unit and circuitry configured to receive an initial value X for a floating-point operation. In this embodiment, X is between 0 and 1.0 inclusive. In this embodiment, the circuitry is configured to generate first and second floating-point values based on an exponent of X that sum to 1. In this embodiment, the floating-point unit is configured to perform an operation using the first and second floating-point values. The apparatus may reduce drift, in this embodiment, when a floating-point representation of X does not guarantee that the sum of X and (1−X) is 1. The apparatus may be configured to perform blending and/or interpolation operations using the first and second floating-point values.

In one embodiment, the apparatus may generate the first and second floating-point values using shifted significand bits of X. In some situations, in one embodiment, the apparatus may generate the first and second floating-point values based on a position of a leading zero in the significand of X. In one embodiment, the apparatus is configured to generate the first and second floating-point values using combinatorial logic.

This specification includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Various units, circuits, or other components may be described or claimed as "configured to" perform a task or tasks. In such contexts, "configured to" is used to connote structure by indicating that the units/circuits/components include structure (e.g., circuitry) that performs the task or tasks during operation. As such, the unit/circuit/component can be said to be configured to perform the task even when the specified unit/circuit/component is not currently operational (e.g., is not on). The units/circuits/components used with the "configured to" language include hardware—for example, circuits, memory storing program instructions executable to implement the operation, etc. Reciting that a unit/circuit/component is "configured to" perform one or more tasks is expressly intended not to invoke 35 U.S.C. §112(f) for that unit/circuit/component.

DETAILED DESCRIPTION

Figure 1A:
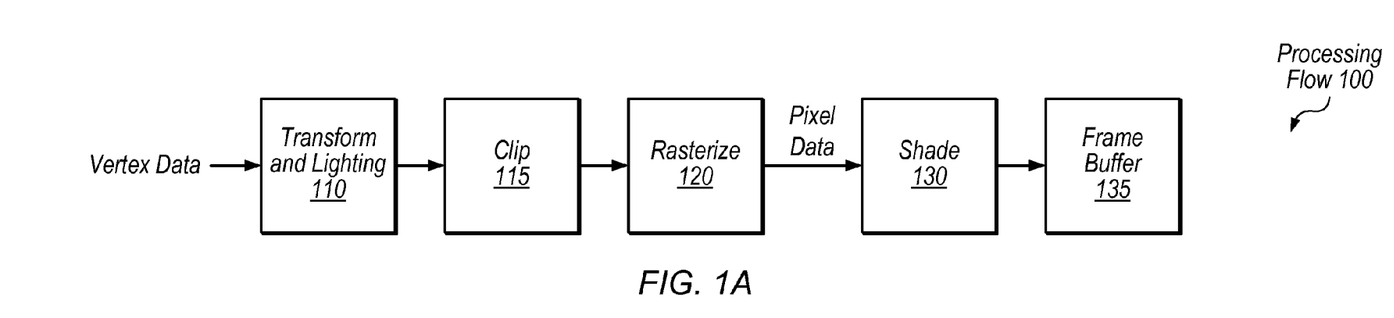
FIG. 1A is a block diagram illustrating an exemplary graphics processing flow.
Figure 1B:
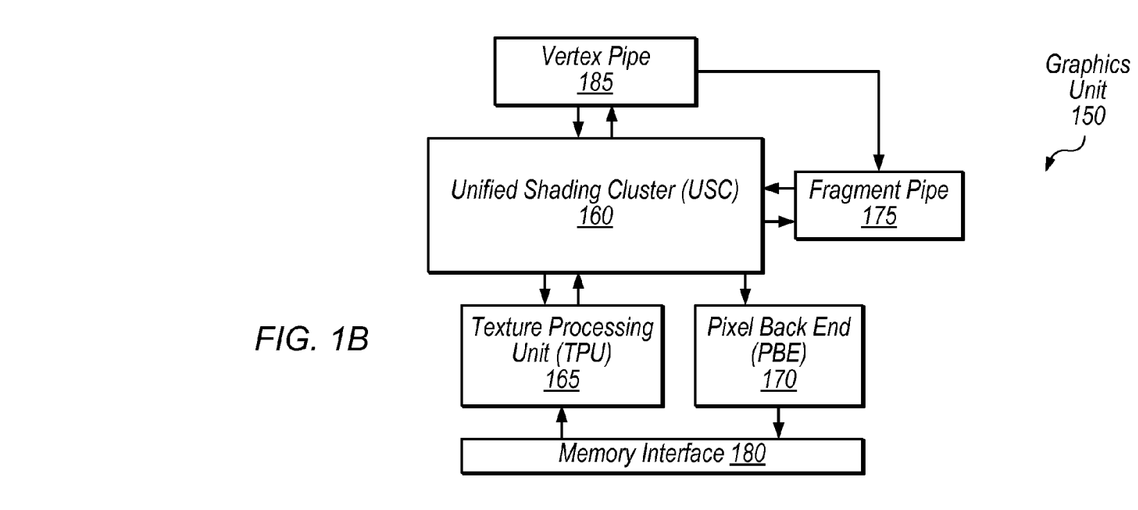
FIG. 1B is a block diagram illustrating one embodiment of a graphics unit.

This disclosure initially describes, with reference to FIGS. 1A-B, an overview of a graphics processing flow and an exemplary graphics unit. It then describes embodiments of a floating-point unit with reference to FIGS. 2-4 and 6. An exemplary device is described with reference to FIG. 5. In some embodiments, the elements and techniques disclosed herein may eliminate drift for interpolation operations by generating floating-point values that sum to 1 in a given floating-point format.

Referring to FIG. 1A, a flow diagram illustrating an exemplary processing flow 100 for processing graphics data is shown. In one embodiment, transform and lighting step 110 may involve processing lighting information for vertices received from an application based on defined light source locations, reflectance, etc., assembling the vertices into polygons (e.g., triangles), and/or transforming the polygons to the correct size and orientation based on position in a three-dimensional space. Clip step 115 may involve discarding polygons or vertices that fall outside of a viewable area. Rasterize step 120 may involve defining fragments or pixels within each polygon and assigning initial color values for each fragment, e.g., based on texture coordinates of the vertices of the polygon. Shade step 130 may involve altering pixel components based on lighting, shadows, bump mapping, translucency, etc. Shaded pixels may be assembled in a frame buffer 135. Modern GPUs typically include programmable shaders that allow customization of shading and other processing steps by application developers. Thus, in various embodiments, the exemplary steps of FIG. 1A may be performed in various orders, performed in parallel, or omitted, and additional processing steps may be implemented.

Referring now to FIG. 1B, a simplified block diagram illustrating one embodiment of a graphics unit 150 is shown. In the illustrated embodiment, graphics unit 150 includes unified shading cluster (USC) 160, vertex pipe 185, fragment pipe 175, texture processing unit (TPU) 165, pixel back end (PBE) 170, and memory interface 180. In one embodiment, graphics unit 150 may be configured to process both vertex and fragment data using USC 160, which may be configured to process graphics data in parallel using multiple execution pipelines or instances.

Vertex pipe 185, in the illustrated embodiment, may include various fixed-function hardware configured to process vertex data. Vertex pipe 185 may be configured to communicate with USC 160 in order to coordinate vertex processing. In the illustrated embodiment, vertex pipe 185 is configured to send processed data to fragment pipe 175 and/or USC 160 for further processing.

Fragment pipe 175, in the illustrated embodiment, may include various fixed-function hardware configured to process pixel data. Fragment pipe 175 may be configured to communicate with USC 160 in order to coordinate fragment processing. Fragment pipe 175 may be configured to perform rasterization on polygons from vertex pipe 185 and/or USC 160 to generate fragment data. Vertex pipe 185 and/or fragment pipe 175 may be coupled to memory interface 180 (coupling not shown) in order to access graphics data.

USC 160, in the illustrated embodiment, is configured to receive vertex data from vertex pipe 185 and fragment data from fragment pipe 175 and/or TPU 165. USC 160 may be configured to perform vertex processing tasks on vertex data which may include various transformations and/or adjustments of vertex data. USC 160, in the illustrated embodiment, is also configured to perform fragment processing tasks on pixel data such as texturing and shading, for example. USC 160 may include multiple execution instances for processing data in parallel. USC 160 may be referred to as "unified" in the illustrated embodiment in the sense that it is configured to process both vertex and fragment data. In other embodiments, programmable shaders may be configured to process only vertex data or only fragment data.

TPU 165, in the illustrated embodiment, is configured to schedule fragment processing tasks from USC 160. In one embodiment, TPU 165 may be configured to pre-fetch texture data and assign initial colors to fragments for further processing by USC 160 (e.g., via memory interface 180). TPU 165 may be configured to provide fragment components in normalized integer formats or floating-point formats, for example. In one embodiment, TPU 165 may be configured to provide fragments in groups of four (a "fragment quad") in a 2×2 format to be processed by a group of four execution instances in USC 160.

PBE 170, in the illustrated embodiment, is configured to store processed tiles of an image and may perform final operations to a rendered image before it is transferred to a frame buffer (e.g., in a system memory via memory interface 180). Memory interface 180 may facilitate communications with one or more of various memory hierarchies in various embodiments.

In various embodiments, a programmable shader such as USC 160 may be coupled in any of various appropriate configurations to other programmable and/or fixed-function elements in a graphics unit. The exemplary embodiment of FIG. 1B shows one possible configuration of a graphics unit 150 for illustrative purposes.

Interpolation Operation Example

In one embodiment, a floating-point value X is received and a specified operation is intended to use X and 1−X as input values. For example, an interpolation operation may determine a result of $C*X+D*(1-X)$ where C, D, and X are input values. In one embodiment, X is between 0 and 1.0 inclusive (i.e., X may be 0, 1.0, or a value between 0 and 1.0). However, a floating-point format used to represent X may not guarantee that X+(1−X) is equal to 1. For example, the sum may be greater or smaller than 1 when X is smaller than 0.5, depending on a rounding mode. This may be caused by the fact that floating-point representations typically provide greater precision for smaller numbers than for larger numbers.

In one embodiment, this may be solved by first determining the value 1−(1−X) and using that value instead of X for the operation when X<0.5 (e.g., because 1−(1−X) and (1−X) may sum to 1 in this situation). However, this may require first determining whether X<0.5 and also may require a number of cycles of a floating-point unit to perform the subtractions. In contrast, in other embodiments described below, determining whether X<0.5 is unnecessary.

Generally, various operations may involve a value X and another value derived from X, where X and the derived value should sum to a given ceiling value but are not guaranteed to sum to the given value using a given floating-point format. Embodiments described below describe techniques for generating values for such operations based on X.

Generating Operand Values

Figure 2:
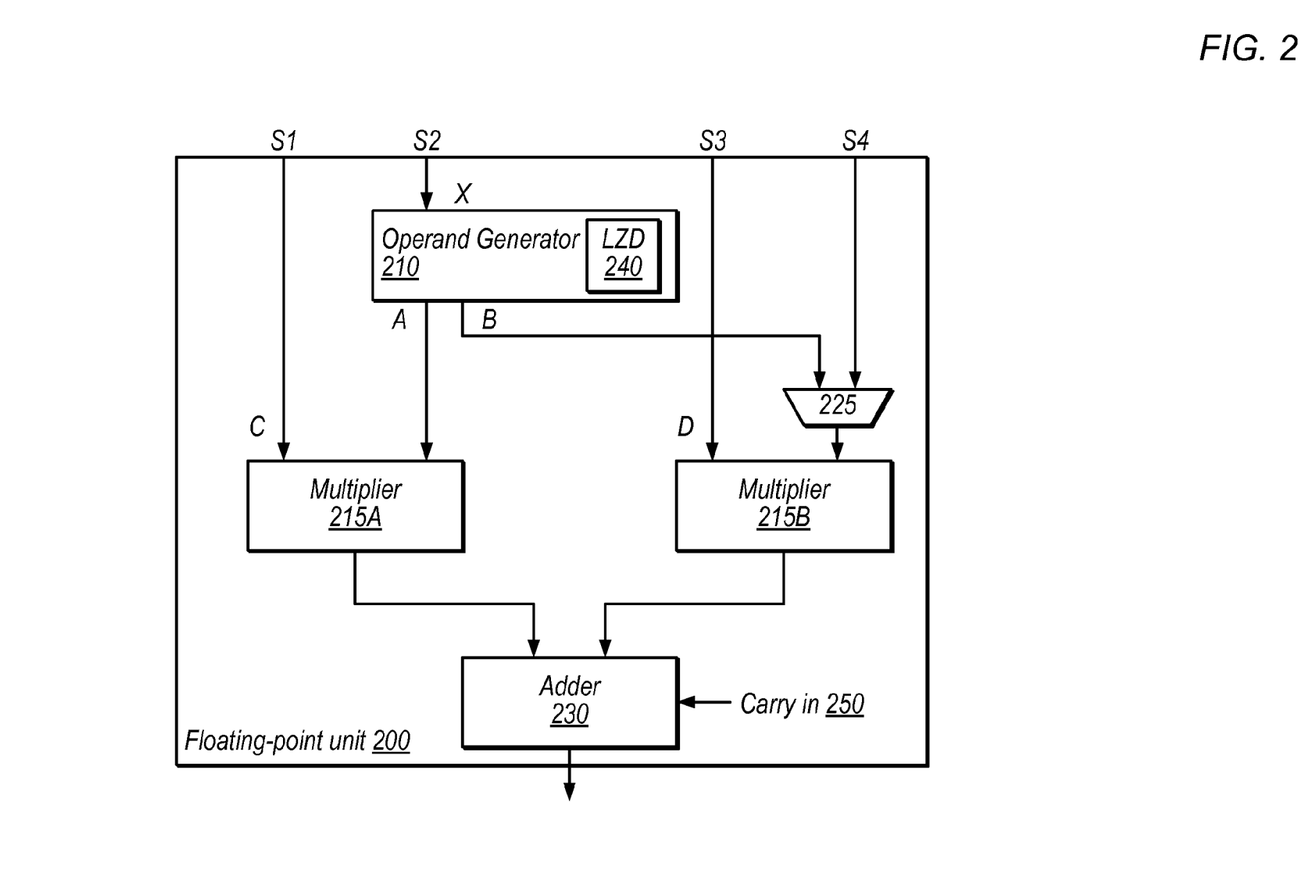
FIG. 2 is a block diagram illustrating one embodiment of a floating-point unit.

In the illustrated embodiment of FIG. 2, floating-point values A and B are generated based on X such that A+B=1. An interpolation operation may then be performed using A and B as input values. This may solve the problem of a shift toward zero without requiring additional cycles of a floating-point unit. In other embodiments, operand values may be generated that sum to values other than 1 using similar techniques. In various embodiments, values may be generated for any of various different number formats having various different numbers of bits.

Referring now to FIG. 2, a block diagram illustrating one embodiment of a floating-point unit 200 is shown. Floating-point unit 200 may be included in an execution pipeline of USC 160, for example. In the illustrated embodiment, floating-point unit 200 includes operand generator 210, multipliers 215A-B, multiplexer (MUX 225) and adder 230.

Floating-point unit 200, in the illustrated embodiment, may be configured to perform various operations using input sources S1-S4. These operations may include, for example: S1*S2, S1+S3, S1*S2+S3*1.0 (multiply-add), S1*S2+S3*S4, etc. In the illustrated embodiment, for interpolation operations, a value X is provided as S2 and input values C and D are provided as S1 and S3.

Operand generator 210, in the illustrated embodiment, is configured to generate input operands A and B for multipliers 215 based on an input operand X. In one embodiment, operand generator 210 is configured to generate A to be equal to or nearly equal to X such that the sum of A and B is 1. In one embodiment, operand generator 210 is configured to generate the operands based on an exponent of X and/or a position of a leading zero in a fraction of X. In one embodiment, leading zero detector (LZD) 240 is configured to determine a position of a leading zero in the fraction of X. In the illustrated embodiment, operands A and B are provided to the inputs of multipliers 215A and 215B. In the illustrated embodiment, MUX 225 is configured to select between B and S4 based on the type of operation being performed. Thus, in one embodiment, floating-point unit 200 is configured to implement interpolation operations as $C*A+D*B$ using inputs X, C, and D.

Multipliers 215, in one embodiment, are configured to multiply their inputs to generate multiplication results. For floating-point values, this may include shifting and multiplying significands while adding exponents of the inputs.

Adder 230, in one embodiment, is configured to add its inputs to produce an addition result. In the illustrated embodiment, adder 230 is configured to add 1 to a least significant bit of the addition result based on carry in signal 250.

In other embodiments, floating-point unit 200 may omit various illustrated elements and/or include similar elements in different configurations. In some embodiments, additional elements may be included. The embodiment of FIG. 2 is intended to illustrate one non-limiting example of a floating-point unit 200 configured to implement various operations using floating-point inputs.

Figure 3:
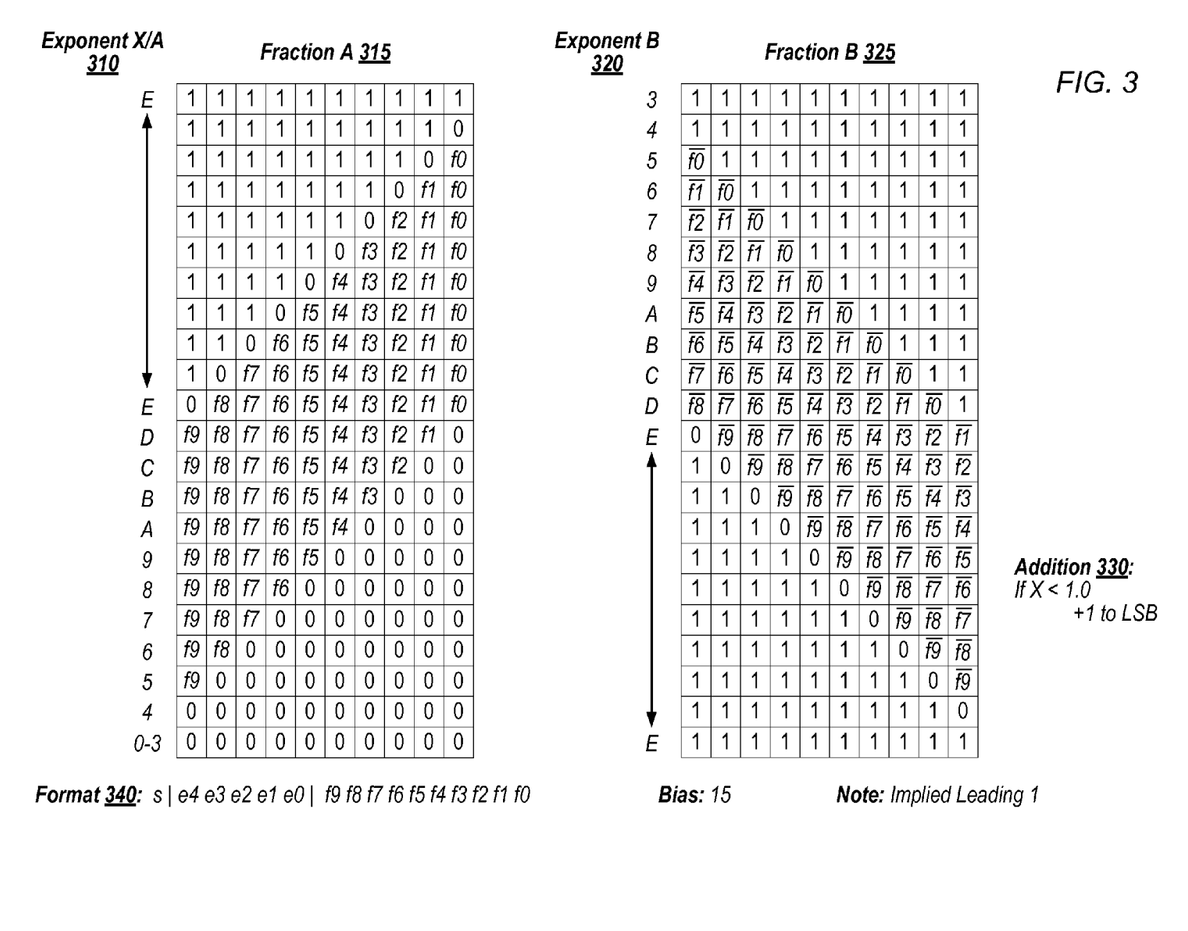
FIG. 3 is a diagram illustrating one embodiment of a technique for generating floating-point values based on an initial floating-point value.

Referring now to FIG. 3, a diagram illustrating one embodiment of a technique for generating values for an interpolation operation is shown. In the illustrated embodiment, operand generator 210 is configured to generate fraction A 315, exponent B 320, and fraction B 325 based on exponent X 310 (which may also be used as an exponent for A) and/or a fraction portion of X.

Format 340 illustrates one embodiment of a 16-bit floating-point format. In the illustrated embodiment, format 340 includes a sign bit (s), five exponent bits (e4-e0), and 10 fraction or significand bits (f9-f0). In other embodiments, other floating-point formats having fields of various sizes may be implemented. In the illustrated embodiment, a leading 1 for the significand is implied and the exponent bias is 15. As an example of use of an exponent bias of 15, an exponent value of 5 indicates a multiplication of the significand by $2^{(5-15)}=2^{-10}$. Thus, an exponent bias may allow representation of negative exponent values. A numeric example using format 340 is described below with reference to FIG. 3. In the illustrated embodiment, A, B, and X are represented using format 340. References to particular bits of format 340 in the grids of FIG. 3 refer to bits of X.

Addition 330 indicates that floating-point unit 200 is configured to add a 1 to a least significant bit of fraction B 325 when X is smaller than 1.0, in the illustrated embodiment. In this embodiment, when X is 1.0, operand generator 210 may set B to 0 and floating-point unit 200 does not perform this addition. In one embodiment, floating-point unit 200 is configured to perform addition 330 using carry-in signal 250. In other embodiments, floating-point unit 200 may be configured to perform the addition using any of various circuitry within floating-point unit 200.

In the illustrated embodiment, if exponent X is E (hexadecimal), fraction A 315 receives the fraction of X without modification. In this situation, operand generator 210 is configured to generate value B based on the position of a leading zero in the fraction of X, in one embodiment. For example, if there is a zero in the least significant bit of the fraction of X, exponent B 320 is 4 and fraction B 325 includes all 1's as shown. In the illustrated embodiment, for other positions of the zero, operand generator 210 is configured to generate fraction B 325 using one or more inverted and shifted fraction bits of X as shown.

Further, in the illustrated embodiment, if exponent X 310 is smaller than E (hexadecimal), operand generator 210 is configured to set exponent B 320 to E (hexadecimal). In this situation, in the illustrated embodiment, operand generator 210 is configured to generate fraction B using inverted and shifted fraction bits (e.g., when exponent X 310 is greater than 4) or generated using constant values (e.g., when exponent X 310 is smaller than or equal to 4). In this situation, in the illustrated embodiment, operand generator 210 is configured to generate fraction A 315 using a truncated fraction of X based on the value of exponent X 310. In other embodiments, fraction A 315 may be a rounded fraction of X that uses fewer bits than the fraction of X.

In the illustrated embodiment, for a given input X, the resulting value A is equal to or nearly equal to X (e.g., when the fraction of A is a truncated fraction X 310) and the sum of A and B equals 1 when represented using format 340. In other embodiments, similar techniques may be performed to generate values A and B that sum to any given desired value based on an input value X.

In one embodiment, one or more combinatorial logic circuits are configured to generate A and B based on X without sequential logic. As used herein, the term "combinatorial logic" is to be interpreted according to its ordinary and accepted meaning in the art, including circuitry that is configured to generate an output based on the present input. Combinatorial logic is in contrast to "sequential logic," which is to be interpreted according to its ordinary and accepted meaning in the art, including circuitry that is configured to generate an output based on the history of the input (e.g., when using memory to store the history of the input). Execution units such as a floating-point unit are typically implemented using combinations of combinatorial and sequential logic. However, in one embodiment, operand generator 210 is configured to generate A and B generated based on X using combinatorial logic only. In another embodiment, operand generator 210 is configured to use a lookup table to generate A and B based on X. In other embodiments, any of various types of circuits may be configured to generate A and B based on X.

In another embodiment (not shown), operand generator 210 is configured to generate an error value based on X instead of generating operands A and B. In this embodiment, operand generator 210 is configured to generate an error value based on an exponent of X and/or a position of a leading zero the fraction of X. In this embodiment, for an interpolation operation, floating-point unit 200 may be configured to perform the operation C*X+D*(1−X)+error_value to achieve a result that would be achieved if X+(1−X) were equal to 1.0. However, in comparison to this embodiment, the embodiment of FIG. 3 may allow less processing for interpolation operations by aligning operands A and B. For example, the illustrated embodiment may allow merging Wallace trees in a Wallace multiplier circuit because of alignment of the input operands.

In various embodiments discussed herein, X is between 0 and 1.0 and A and B sum to 1. In other embodiments, similar techniques may be used when X is a value between given a floor value and ceiling value, where X is represented in a format that does not guarantee that X+(ceiling_value−X) will equal the ceiling value.

Figure 4:
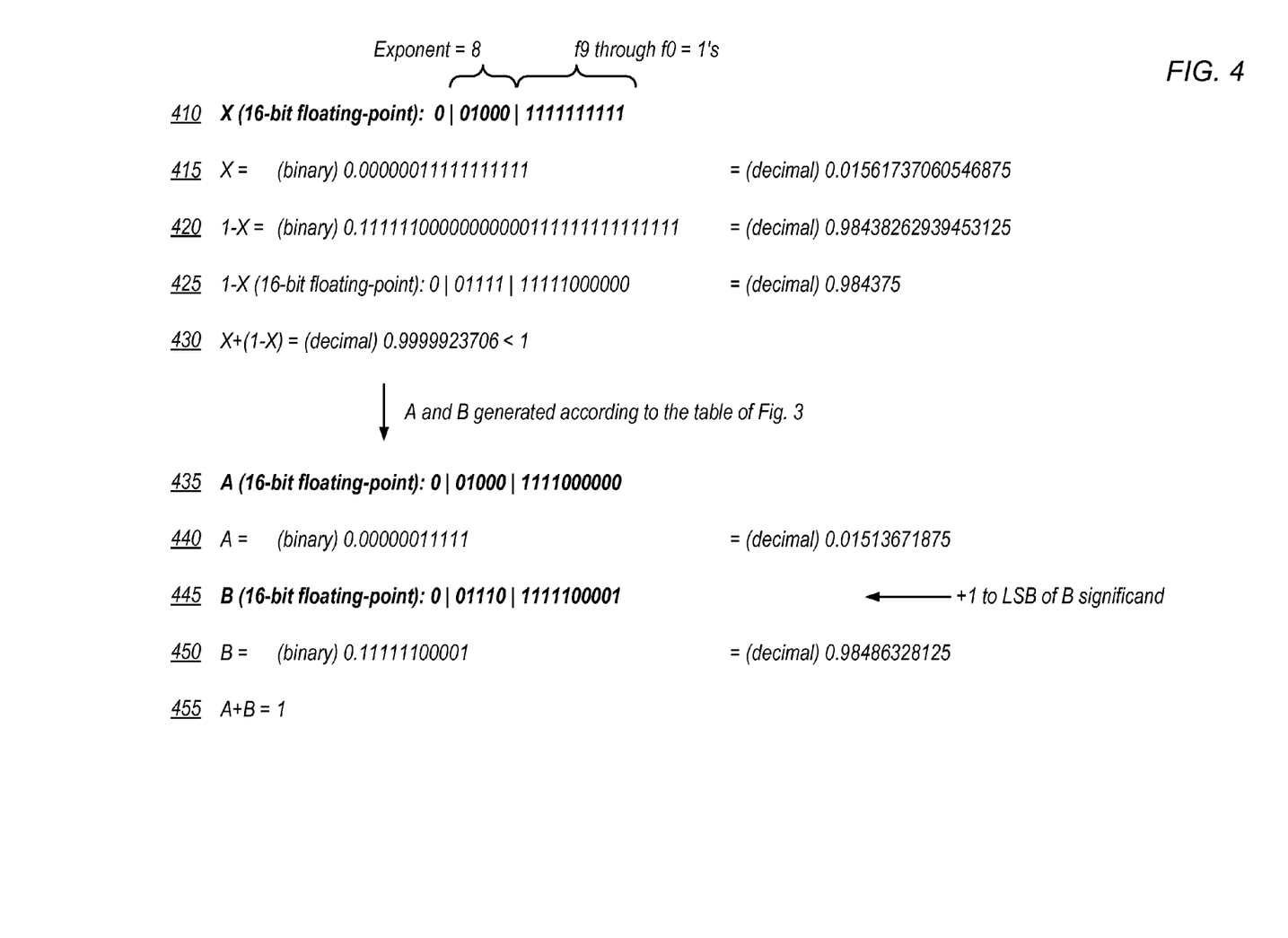
FIG. 4 is a diagram illustrating a numerical example using the technique of FIG. 3.

Referring now to FIG. 4, a numerical example of generating values A and B based on X is shown. Line 410, in the illustrated embodiment, shows a representation of X using floating-point format 340.

Line 415, in the illustrated embodiment, shows binary and decimal representations of the value X.

Line 420, in the illustrated embodiment, shows binary and decimal representations of the value 1−X.

Line 425, in the illustrated embodiment, shows a 16-bit floating-point representation of 1−X. In this embodiment, the 16-bit floating-point format cannot represent 1−X, because it does not include enough fraction bits for some of the less significant 1's of the binary representation. In the illustrated embodiment, a rounding mode is "round to zero." Therefore, the representation of 1−X is truncated in the illustrated example. When representing values using other rounding modes, 1−X may be approximated by rounding up rather than truncating, for example. Using various rounding modes, X and 1−X may not be guaranteed to be equal to 1. Examples of other rounding modes include round to nearest, round to infinity, and round to negative infinity.

Line 430, in the illustrated embodiment, shows that X+(1−X), when represented using the 16-bit floating-point format, is less than 1. As discussed above, this may cause a shift toward zero when multiple interpolation operations are performed. When other rounding modes are implemented, a shift toward 1 may similarly occur.

In the illustrated embodiment, rather than using X and 1−X for an interpolation operation, floating-point unit 200 is configured to generate values A and B for use in the operation.

Line 435, in the illustrated embodiment, shows a floating-point representation of A, as generated according to the embodiment discussed above with reference to FIG. 3 for an exponent X 310 of 8. Line 440, in the illustrated embodiment, shows binary and decimal representations of A.

Line 445, in the illustrated embodiment, shows a floating-point representation of B, e.g., as generated according to the embodiment discussed above with reference to FIG. 3. Line 450, in the illustrated embodiment, shows binary and decimal representations of B. As shown, B includes four inverted and shifted bits of X (f9-f6) and includes a value of 1 added to its least significant bit (e.g., as indicated by addition 430).

Line 455, in the illustrated embodiment, shows that the sum of A and B is 1. The techniques disclosed with reference to FIGS. 2-4 may be performed in various embodiments without determining whether X is smaller than 0.5 and without performing subtraction to generate 1−X or 1−(1−X).

Figure 5:
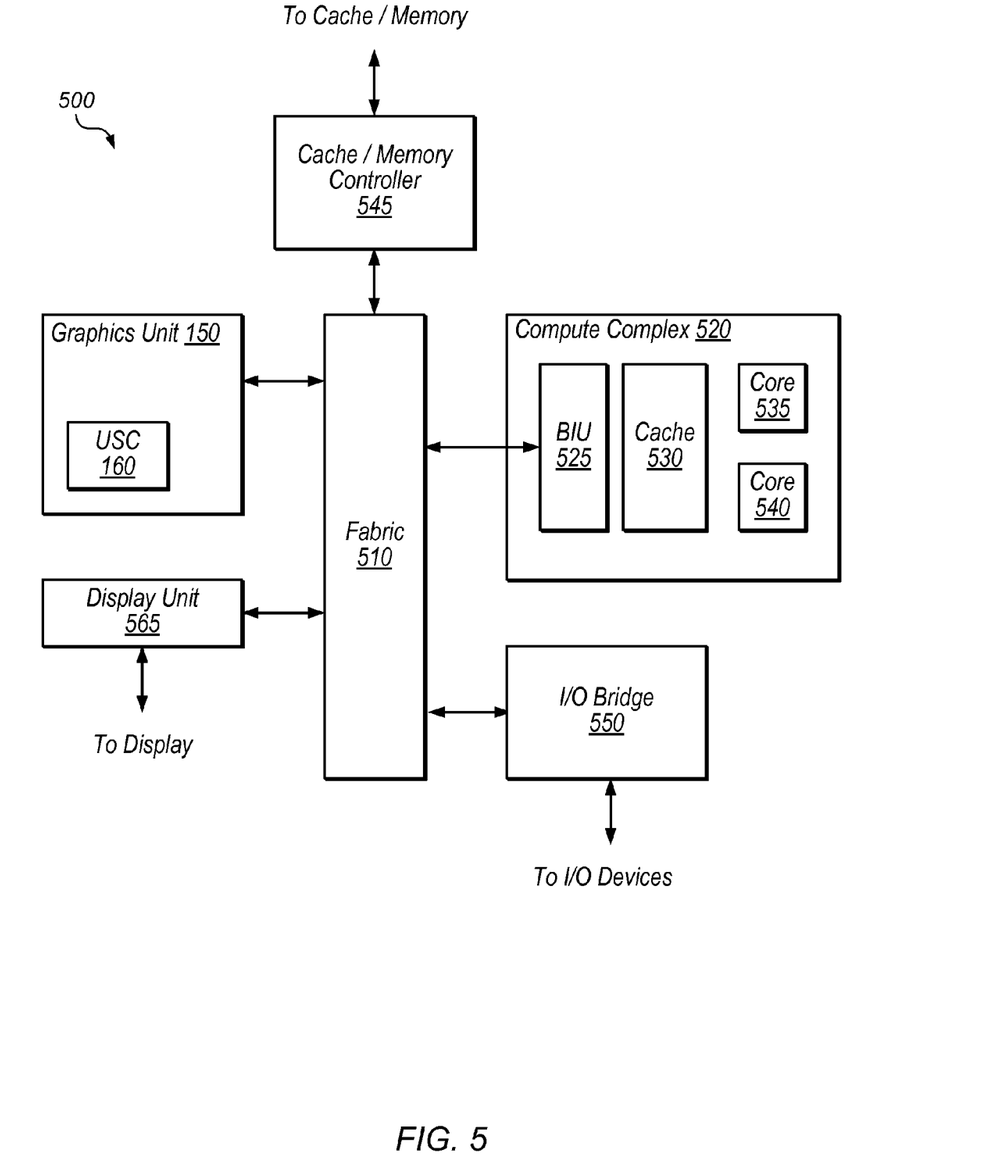
FIG. 5 is a block diagram illustrating one embodiment of a device that includes a graphics unit.

Referring now to FIG. 5, a block diagram illustrating an exemplary embodiment of a device 500 is shown. In some embodiments, elements of device 500 may be included within a system on a chip. In some embodiments, device 500 may be included in a mobile device, which may be battery-powered. Therefore, power consumption by device 500 may be an important design consideration. In the illustrated embodiment, device 500 includes fabric 510, compute complex 520, input/output (I/O) bridge 550, cache/memory controller 545, graphics unit 150, and display unit 565.

Fabric 510 may include various interconnects, buses, MUX's, controllers, etc., and may be configured to facilitate communication between various elements of device 500. In some embodiments, portions of fabric 510 may be configured to implement various different communication protocols. In other embodiments, fabric 510 may implement a single communication protocol and elements coupled to fabric 510 may convert from the single communication protocol to other communication protocols internally.

In the illustrated embodiment, compute complex 520 includes bus interface unit (BIU) 525, cache 530, and cores 535 and 540. In various embodiments, compute complex 520 may include various numbers of cores and/or caches. For example, compute complex 520 may include 1, 2, or 4 processor cores, or any other suitable number. In one embodiment, cache 530 is a set associative L2 cache. In some embodiments, cores 535 and/or 540 may include internal instruction and/or data caches. In some embodiments, a coherency unit (not shown) in fabric 510, cache 530, or elsewhere in device 500 may be configured to maintain coherency between various caches of device 500. BIU 525 may be configured to manage communication between compute complex 520 and other elements of device 500. Processor cores such as cores 535 and 540 may be configured to execute instructions of a particular instruction set architecture (ISA) which may include operating system instructions and user application instructions.

Cache/memory controller 545 may be configured to manage transfer of data between fabric 510 and one or more caches and/or memories. For example, cache/memory controller 545 may be coupled to an L3 cache, which may in turn be coupled to a system memory. In other embodiments, cache/memory controller 545 may be directly coupled to a memory. In some embodiments, cache/memory controller 545 may include one or more internal caches.

As used herein, the term "coupled to" may indicate one or more connections between elements, and a coupling may include intervening elements. For example, in FIG. 5, graphics unit 150 may be described as "coupled to" a memory through fabric 510 and cache/memory controller 545. In contrast, in the illustrated embodiment of FIG. 5, graphics unit 150 is "directly coupled" to fabric 510 because there are no intervening elements.

Graphics unit 150 may be configured as described above with reference to FIGS. 1B, 2, and 3. Graphics unit 150 may include one or more processors and/or one or more graphics processing units (GPU's). Graphics unit 150 may receive graphics-oriented instructions, such OPENGL® or DIRECT3D® instructions, for example. Graphics unit 150 may execute specialized GPU instructions or perform other operations based on the received graphics-oriented instructions. Graphics unit 150 may generally be configured to process large blocks of data in parallel and may build images in a frame buffer for output to a display. Graphics unit 150 may include transform, lighting, triangle, and/or rendering engines in one or more graphics processing pipelines. Graphics unit 150 may output pixel information for display images. In the illustrated embodiment, graphics unit 150 includes USC 160.

Display unit 565 may be configured to read data from a frame buffer and provide a stream of pixel values for display. Display unit 565 may be configured as a display pipeline in some embodiments. Additionally, display unit 565 may be configured to blend multiple frames to produce an output frame. Further, display unit 565 may include one or more interfaces (e.g., MIPI® or embedded display port (eDP)) for coupling to a user display (e.g., a touchscreen or an external display).

I/O bridge 550 may include various elements configured to implement: universal serial bus (USB) communications, security, audio, and/or low-power always-on functionality, for example. I/O bridge 550 may also include interfaces such as pulse-width modulation (PWM), general-purpose input/output (GPIO), serial peripheral interface (SPI), and/or inter-integrated circuit (I2C), for example. Various types of peripherals and devices may be coupled to device 500 via I/O bridge 550.

Figure 6:
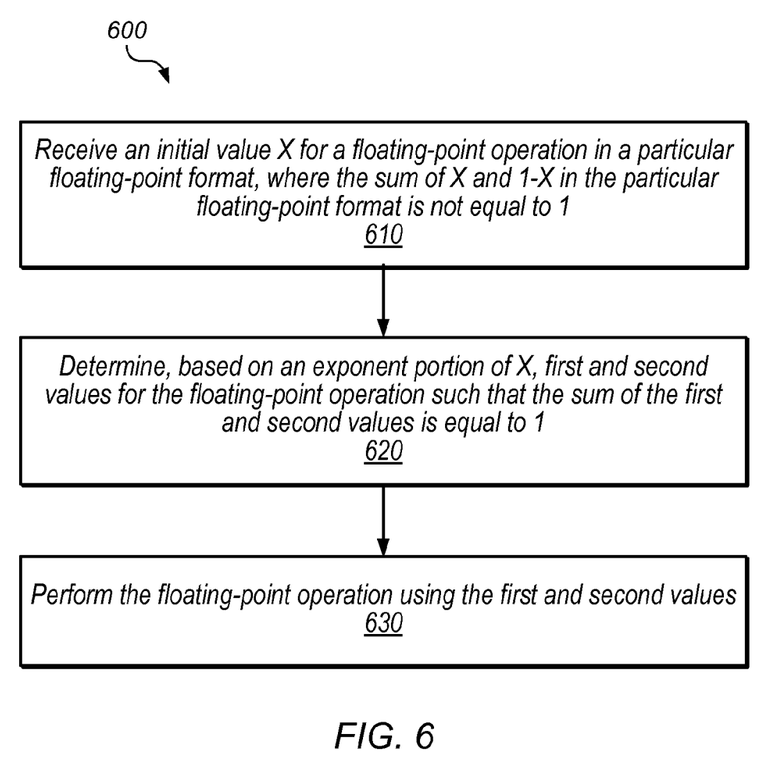
FIG. 6 is a flow diagram illustrating one embodiment of a method for generating values for a floating-point operation.

Referring now to FIG. 6, a flow diagram illustrating one exemplary embodiment of a method for generating values for a floating-point operation is shown. The method shown in FIG. 6 may be used in conjunction with any of the computer systems, devices, elements, or components disclosed herein, among other devices. In various embodiments, some of the method elements shown may be performed concurrently, in a different order than shown, or may be omitted. Additional method elements may also be performed as desired. Flow begins at block 610.

At block 610, an initial value X is received for a floating-point operation. In this embodiment, X is represented using a particular floating-point format where the sum of X and 1−X in the particular floating-point format is not equal to 1. For example, X may be a small number such that it is represented in the floating-point format with greater precision than 1−X. X may be between 0 and 1.0 inclusive. In one embodiment, operand generator 210 is configured to generate values A and B regardless of whether X and 1−X sum to 1 in the particular floating-point format. This may reduce power consumption by eliminating a comparator circuit. Operand generator 210, in one embodiment, is configured to generate the first and second values such that their sum is 1 in the particular floating-point format for any given value of X. Flow proceeds to block 620.

At block 620, it is determined, based on an exponent portion of X, first and second values for the floating-point operation such that the sum of the first and second values is 1. In one embodiment, the first and second values may be determined based on a position of a leading zero in a significant of X as well as the exponent portion of X. The first and second values may be generated using shifted and/or inverted fraction bits of X. Flow proceeds to block 630.

At block 630, the floating-point operation is performed using the first and second values. The floating-point operation may be a blending operation or interpolation operation, for example. Performing the operation using the first and second values may reduce or eliminate drift toward 0 or 1.0 depending on a rounding mode, in various embodiments. Flow ends at block 630.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
   a floating-point unit; and
   one or more circuits configured to:
   receive an initial value X for a floating-point operation, wherein X is a value in the range from 0 to 1.0 inclusive; and
   generate first and second floating-point values based on an exponent of X such that a sum of the first and second floating-point values is 1 in a particular floating-point format;
   wherein the floating-point unit is configured to perform an operation using the first and second floating-point values, wherein the floating-point unit is configured to perform the operation using the particular floating-point format.

2. The apparatus of claim 1, wherein the one or more circuits are configured to generate the first floating-point value using a truncated fraction portion of X when the exponent of X is less than a particular value.

3. The apparatus of claim 1, wherein the one or more circuits are configured to generate a significand of the second floating-point value using shifted and inverted significand bits of X.

4. The apparatus of claim 1, wherein the one or more circuits are configured to generate the first and second floating-point values using only combinatorial logic.

5. The apparatus of claim 1, wherein the one or more circuits are configured to generate the first and second floating-point values using a lookup table.

6. The apparatus of claim 1, wherein the one or more circuits are configured to generate the first floating-point value as equal to X when the exponent of X is greater than a particular value.

7. The apparatus of claim 1, further comprising:
   a leading zero detector;
   wherein the one or more circuits are further configured to generate the first and second floating-point values based on a position of a leading zero in a significand of X.

8. A method, comprising:
   receiving an initial value X for a floating-point operation, wherein X is represented in a particular floating-point format, wherein the sum of X and 1−X in the particular floating-point format is not equal to 1;
   determining, based on an exponent portion of X, first and second values for the floating-point operation such that the sum of the first and second values is equal to 1; and
   performing the floating-point operation using a floating-point unit and the first and second values, using the particular floating-point format.

9. The method of claim 8, wherein X is a value in the range from 0 to 1.0 inclusive.

10. The method of claim 8, wherein the first value is represented using a truncated significand of X.

11. The method of claim 8, wherein a significand of the second value includes shifted and inverted bits of a significand of X.

12. The method of claim 8,
    wherein the operation is an interpolation operation; and
    wherein the determining is performed using combinatorial logic.

13. The method of claim 8, wherein the determining is further based on a position of a leading zero in a significand of X.

14. The method of claim 8, further comprising:
    adding a 1 to a least significant bit of a significand of the second value in response to determining that X is less than 1.0.

15. A method, comprising:
    receiving a floating-point value X in a particular floating-point format, wherein X is a value in a range from a floor value to a ceiling value inclusive;
    generating floating-point values A and B based on an exponent of X, wherein the generating guarantees that a sum of A and B equals the ceiling value in the particular floating-point format for any given value of X; and
    performing, by a floating-point unit, an operation using A and B and the particular floating-point format.

16. The method of claim 15, wherein the operation is C times A plus D times B and wherein C and D are floating-point values received by the floating-point unit.

17. The method of claim 15, wherein the generating includes generating A using a smaller number of significand bits than a number of significand bits of X when the exponent of X is less than a threshold value.

18. The method of claim 15, wherein the generating the floating-point value B includes generating a fraction portion of B by shifting and inverting one or more bits of a fraction portion of X.

19. The method of claim 15, wherein the generating is further based on a position of a leading zero in a fraction portion of X.

20. The method of claim 15, wherein the particular floating-point format does not guarantee that a sum of X and the ceiling value minus X is equal to the ceiling value.

\* \* \* \* \*